No. 783,258. PATENTED FEB. 21, 1905.
L. D. FRENOT.
SAFETY NUT LOCK.
APPLICATION FILED APR. 15, 1904.
*Fig. 1.*
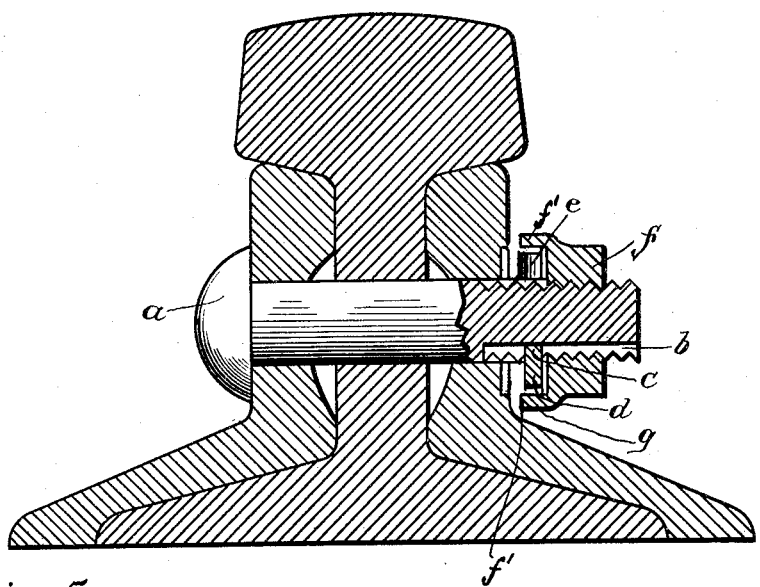
*Fig. 5.*
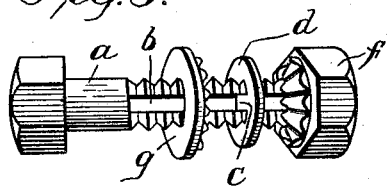
*Fig. 3.*
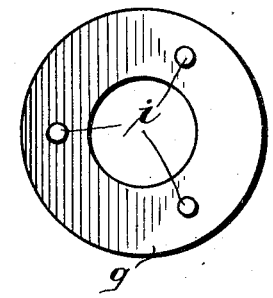
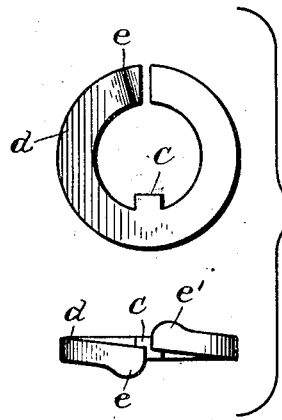
*Fig. 2.*
*Fig. 4.*
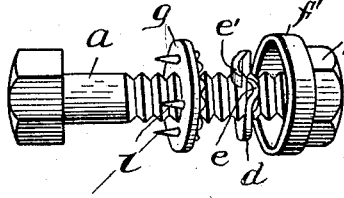
WITNESSES:
T. P. Brett
Ev. Heinicke
INVENTOR
Louis D. Frenot
BY G. Littman
Attorney No. 783,258.

Patented February 21, 1905.

UNITED STATES PATENT OFFICE.

LOUIS D. FRENOT, OF NEWARK, NEW JERSEY.

SAFETY NUT-LOCK.

SPECIFICATION forming part of Letters Patent No. 783,258, dated February 21, 1905.

Application filed April 15, 1904. Serial No. 203,347.

*To all whom it may concern:*

Be it known that I, LOUIS D. FRENOT, a citizen of the French Republic, residing at Newark, New Jersey, have invented certain new and useful Improvements in Safety Nut-Locks; and I do hereby declare the following to be a full, clear, and exact description, such as will enable others skilled in the art to which it appertains to make and use the same.

My invention relates to nut-locks for bolts, and more especially to that class of bolts where resilient and corrugated rings or washers are used.

In the accompanying drawings, Figure 1 is a cross-section through a rail with fish-plates, bolt, washers, and nut embodying my invention, the nut being not entirely screwed home. Fig. 2 shows in elevation a spring-ring. Fig. 3 is a front face and cross section of a modified form of washer. Fig. 4 is a perspective view of an ordinary bolt with the improvement. Fig. 5 is a perspective view of a grooved bolt with the parts modified conformingly.

The bolt $a$ is provided with a longitudinal groove $b$, into which a tooth $c$ of the spring-ring $d$, Fig. 2, engages. Said ring has at the meeting ends rounded reinforcements $e$ and $e'$, adapted to engage rounded corrugated surfaces on the nut $f$ and on a washer $g$. Said washer is not employed in all cases. When the bolt is grooved and the spring-ring $d$ engages the groove with a tooth $c$, the ring is prevented from turning and the reinforcement $e$ at one end is sufficient to engage the corrugations on the nut $f$. The other reinforcement, $e'$, in this instance may be omitted, and the ring is smooth and leans against the surface of the fish-plate or other parts.

In using a corrugated washer $g$ I provide the ring $d$ with reinforcements $e$ and $e'$ at both of the meeting ends, one to coöperate with the corrugations of the washer $g$. Said washer is preferably used for uniting pieces of woodwork, as will be hereinafter explained; but in using the nut-lock for rails I preferably stamp the corrugations directly into the metal of a fish-plate or any other metal part of the elements to be united by the bolt and nut.

It is evident that by screwing the nut $f$ home the reinforcements $e$ and $e'$ will rest in one or the other of the corrugations in the opposite surfaces of the nut $f$ and the washer $g$ or the corrugations stamped in the fish-plate, and any accidental or undesired loosening of the nut will be impossible. The locking of the device in this way will be even perfectly safe when the tooth $c$ is omitted and when the bolt $a$ has no groove.

The rounding of the corrugations and of the projections on the split ring is of great importance. Heretofore in similar devices the projections to be engaged have been made sharp, and though the tightening of the nut was comparatively easy it was always very difficult to unscrew the nut. This inconvenience is done away with by the rounded corrugations, which allow the unscrewing of the nut as readily almost as an ordinary nut which is not provided with a nut-lock.

The stamping of the corrugations into the metal of the fish-plate also offers a great advantage. The production of the fish-plates with the corrugations does not increase the cost of manufacture in the least, and it makes a washer entirely unnecessary.

In using my improved nut-lock for wooden structures I provide the washer $g$ with pointed pins $i$, Fig. 3. These pointed pins sink in the wood when the nut is screwed up tight and prevent the washer $g$ from turning. Thus the nut is locked by the spring-ring, Fig. 2, in the manner above described.

In the above-described device I have referred to an ordinary nut having radial rounded corrugations in its lower surface; but in the cross-section, Fig. 1, I have shown a nut $f$ being provided with an annular projection $f'$ integral with the nut and being stamped or forged in one piece with the nut simultaneously with the corrugations. This annular projection $f'$ is of great advantage. It is preferably made as deep as the thickness of the split ring $d$, Fig. 2, when the same is flattened, being clamped tight between the nut and the washer or between the nut and the corrugations of the fish-plate. Thus the ring $f'$ comes with its outer edge in close contact with the edge of the washer, fully incasing the split ring $d$ and the corrugated faces, like a protecting-cup, and thereby excluding sand, dirt, and all foreign matter, which otherwise would accumulate in the spaces between the corrugations. In this manner the inner parts are kept clean and the loosening of the nuts at all times will be easy and unimpaired.

The depth of the projecting-ring $f'$ is sufficient when it is made about equal to the thickness of the ring $d$, having the ends $e$ and $e'$ jammed into one plane; but in some cases it may be preferable to make the projection a little deeper, so that the front edge comes in close contact with the fish-plate, thus inclosing everything. It is evident that by this means the cup-shaped protecting-ring $f'$ will exclude all danger of breaking the split ring, for in drawing the nut tight and jamming the cup against the fish-plate, thereby solidly uniting the parts, the free space within the cup though large enough to pass the split ring with its teeth into the corrugations is not so narrow as to flatten it out altogether, and in such instances to make it liable to break. Thus the cup not only excludes all dirt and dust, but also effectually protects the split ring, which by its elasticity is adapted to hold the nut securely in its tightened position.

At any time the unscrewing of the nut can be effected easily with an ordinary wrench without injury to any of the parts.

Having thus described my invention, what I claim as new, and desire to secure by Letters Patent, is—

In a nut-lock, the combination of a bolt having a longitudinal groove, a spring-ring on said bolt and having a tooth engaged in said groove and having its ends opposite said tooth formed with rounded reinforcements, a washer sleeved upon said bolt with means to prevent its rotation and having upon one side corrugations adapted to directly engage one of said reinforcements, and a nut threaded upon said bolt and having corrugations to engage directly with the other reinforcement of said ring said nut having an annular projection of a depth equal to the thickness of said ring to fully incase the latter, the outer edge of said projection directly engaging said washer and receiving its corrugations all substantially as shown and described.

In testimony whereof I affix my signature.

LOUIS D. FRENOT.

In presence of—
G. DITTMAR,
GER. HEINIOKER.